United States Patent
Zhou et al.

(10) Patent No.: US 10,872,228 B1
(45) Date of Patent: Dec. 22, 2020

(54) THREE-DIMENSIONAL OBJECT DETECTION

(71) Applicants: Yin Zhou, Cupertino, CA (US); Russell Y. Webb, San Jose, CA (US); Luca Ballan, Bellevue, WA (US); Cuneyt Oncel Tuzel, Cupertino, CA (US)

(72) Inventors: Yin Zhou, Cupertino, CA (US); Russell Y. Webb, San Jose, CA (US); Luca Ballan, Bellevue, WA (US); Cuneyt Oncel Tuzel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 161 days.

(21) Appl. No.: 16/142,144

(22) Filed: Sep. 26, 2018

Related U.S. Application Data

(60) Provisional application No. 62/563,681, filed on Sep. 27, 2017.

(51) Int. Cl.
| | | |
|---|---|---|
| *G01S 17/04* | (2020.01) | |
| *G01S 17/06* | (2006.01) | |
| *G01S 17/89* | (2020.01) | |
| *G06K 9/00* | (2006.01) | |

(52) U.S. Cl.
CPC ......... *G06K 9/00201* (2013.01); *G01S 17/04* (2020.01); *G01S 17/06* (2013.01); *G01S 17/89* (2013.01); *G06K 9/00791* (2013.01)

(58) Field of Classification Search
None
See application file for complete search history.

(56) References Cited

U.S. PATENT DOCUMENTS

| | | | |
|---|---|---|---|
| 8,428,343 B2 * | 4/2013 | Hyung ................. | H04N 13/271 382/154 |
| 8,605,998 B2 | 12/2013 | Samples et al. | |
| 8,855,849 B1 | 10/2014 | Ferguson et al. | |
| 2004/0258279 A1 * | 12/2004 | Hirvonen ........... | G06K 9/00369 382/104 |

(Continued)

OTHER PUBLICATIONS

Dequaire et al., "Deep tracking in the wild: End-to-end tracking using recurrent neural networks," The International Journal of Robotics Research 2018, vol. 37(4-5) 492-512. First published Jun. 22, 2017 (Year: 2017).*

(Continued)

*Primary Examiner* — Soo Shin
(74) *Attorney, Agent, or Firm* — Young Basile Hanlon & MacFarlane, P.C.

(57) ABSTRACT

A method for detecting objects in an environment includes obtaining, from one or more sensors, distance measurements from the one or more sensors to portions of the environment, generating a representation of a three-dimensional space using the distance measurements, identifying object features in the representation of the three-dimensional space using a neural network, comparing the object features to pre-defined three-dimensional templates to generate scores that represent correspondence of the object features to the pre-defined three-dimensional templates, and determining a location and a rotational orientation for a three-dimensional object based on the scores.

21 Claims, 11 Drawing Sheets

(56) References Cited

U.S. PATENT DOCUMENTS

| | | | |
|---|---|---|---|
| 2010/0097458 A1 | 4/2010 | Zhang et al. | |
| 2010/0098290 A1 | 4/2010 | Zhang et al. | |
| 2010/0098297 A1 | 4/2010 | Zhang | |
| 2010/0104199 A1 | 4/2010 | Zhang et al. | |
| 2010/0121577 A1 | 5/2010 | Zhang et al. | |
| 2011/0026770 A1 | 2/2011 | Brookshire | |
| 2015/0120244 A1 | 4/2015 | Ma et al. | |
| 2015/0138310 A1 | 5/2015 | Fan et al. | |
| 2016/0171316 A1 | 6/2016 | Fritsch et al. | |
| 2016/0217335 A1 | 7/2016 | Levi et al. | |
| 2016/0291155 A1 | 10/2016 | Nehmadi et al. | |
| 2017/0286901 A1* | 10/2017 | Skaff | G06K 9/3241 |
| 2017/0372527 A1* | 12/2017 | Murali | G01S 17/48 |
| 2019/0096086 A1* | 3/2019 | Xu | G06K 9/00791 |
| 2019/0147220 A1* | 5/2019 | McCormac | G06K 9/00201 |
| | | | 382/103 |

OTHER PUBLICATIONS

Foka et al., "Probabilistic Autonomous Robot Navigation in Dynamic Environments with Human Motion Prediction," Int J Soc Robot (2010) 2:79-94 (Year: 2010).*

Liu et al., "Ship Rotated Bounding Box Space for Ship Extraction From High-Resolution Optical Satellite Images with Complex Backgrounds," IEEE Geoscience and Remote Sensing Letters, vol. 13, Issue 8, Aug. 2016 (Year: 2016).*

Mattausch et al., "Object Detection and Classification from Large-Scale Cluttered Indoor Scans," Computer Graphics Forum, Geometry Acquisition, Reconstruction and Analysis, vol. 33 (2014), No. 2 (Year: 2014).*

* cited by examiner

THREE-DIMENSIONAL OBJECT DETECTION

CROSS-REFERENCE TO RELATED APPLICATIONS

This application claims the benefit of U.S. Provisional Application No. 62/563,681, filed on Sep. 27, 2017, the content of which is hereby incorporated by reference in its entirety for all purposes.

TECHNICAL FIELD

This disclosure relates to detecting three-dimensional objects using sensor information.

BACKGROUND

The accurate detection of objects is valuable for a wide range of navigation applications. Remote sensing methodologies can be used to gather information regarding the objects but suffer from accuracy constraints.

SUMMARY

One aspect of the disclosed embodiments is a method for detecting objects in an environment includes obtaining, from one or more sensors, distance measurements from the one or more sensors to portions of the environment, and generating a representation of a three-dimensional space using the distance measurements. The method also includes identifying object features in the representation of the three-dimensional space using a neural network. The method also includes comparing the object features to pre-defined three-dimensional templates to generate scores that represent correspondence of the object features to the pre-defined three-dimensional templates and determining a location and a rotational orientation for a three-dimensional object based on the scores. In some implementations, the pre-defined three-dimensional templates each include rotated bounding boxes that each have a length value, a width value, a height value, and a rotation value.

Another aspect of the disclosed embodiments is a non-transitory computer-readable storage device including program instructions executable by one or more processors that, when executed, cause the one or more processors to perform operations for detecting objects in an environment. The operations include obtaining, from one or more sensors, distance measurements from the one or more sensors to portions of the environment and generating a representation of a three-dimensional space using the distance measurements. The operations also include identifying object features in the representation of the three-dimensional space using a neural network. The operations also include comparing the object features to pre-defined three-dimensional templates to generate scores that represent correspondence of the object features to the pre-defined three-dimensional templates. The operations also include determining a location and a rotational orientation for a three-dimensional object based on the scores. In some implementations, the pre-defined three-dimensional templates each include rotated bounding boxes that each have a length value, a width value, a height value, and a rotation value.

Another aspect of the disclosed embodiments is a system for detecting objects in an environment. The system includes one or more sensors, a memory, and a processor configured to execute instructions stored in the memory. The instructions, when executed, cause the processor to obtain, from the one or more sensors, distance measurements from the one or more sensors to portions of the environment and generate a representation of a three-dimensional space using the distance measurements. The instructions also cause the processor to identify object features in the representation of the three-dimensional space using a neural network. The instructions also cause the processor to compare the object features to pre-defined three-dimensional templates to generate scores that represent correspondence of the object features to the pre-defined three-dimensional templates and determine a location and a rotational orientation for a three-dimensional object based on the scores. In some implementations, the pre-defined three-dimensional templates each include rotated bounding boxes that each have a length value, a width value, a height value, and a rotation value.

DETAILED DESCRIPTION

Vehicle navigation (e.g., manual, semi-autonomous, fully autonomous) requires the accurate detection of objects (e.g., other vehicles, pedestrians, buildings, etc.) along a navigated pathway. Vehicles can use sensors (e.g., embedded vehicle sensors, external sensors that communicate information wirelessly to the vehicle, etc.) to detect information associated with the objects to enable the proper vehicle navigation.

The present disclosure provides a method and system for detecting objects (e.g., three-dimensional objects) in a three-dimensional space using sensor information (i.e., remote sensing information) and for determining information associated with the detected objects using the sensor information. The method and system utilizes a detection algorithm (e.g., a 3D detection algorithm) to directly model the orientation of the objects into the three-dimensional space. The sensor information can include but is not limited to LIDAR point clouds (e.g., 3D LIDAR point clouds). The information associated with the detected objects can include but is not limited to locations (i.e., x, y, z coordinates), shape/size (i.e., width and height measurements), and rotation orientation. The present disclosure provides a system that performs an end-to-end deep neural network (DNN) mechanism or other machine learning system to accurately detect objects and to accurately determine rotation information from detected sensor information including but not limited to point cloud data. The machine learning system can be used for multi-modal active learning, annotation intelligence, and autonomy perception.

Figure 1:
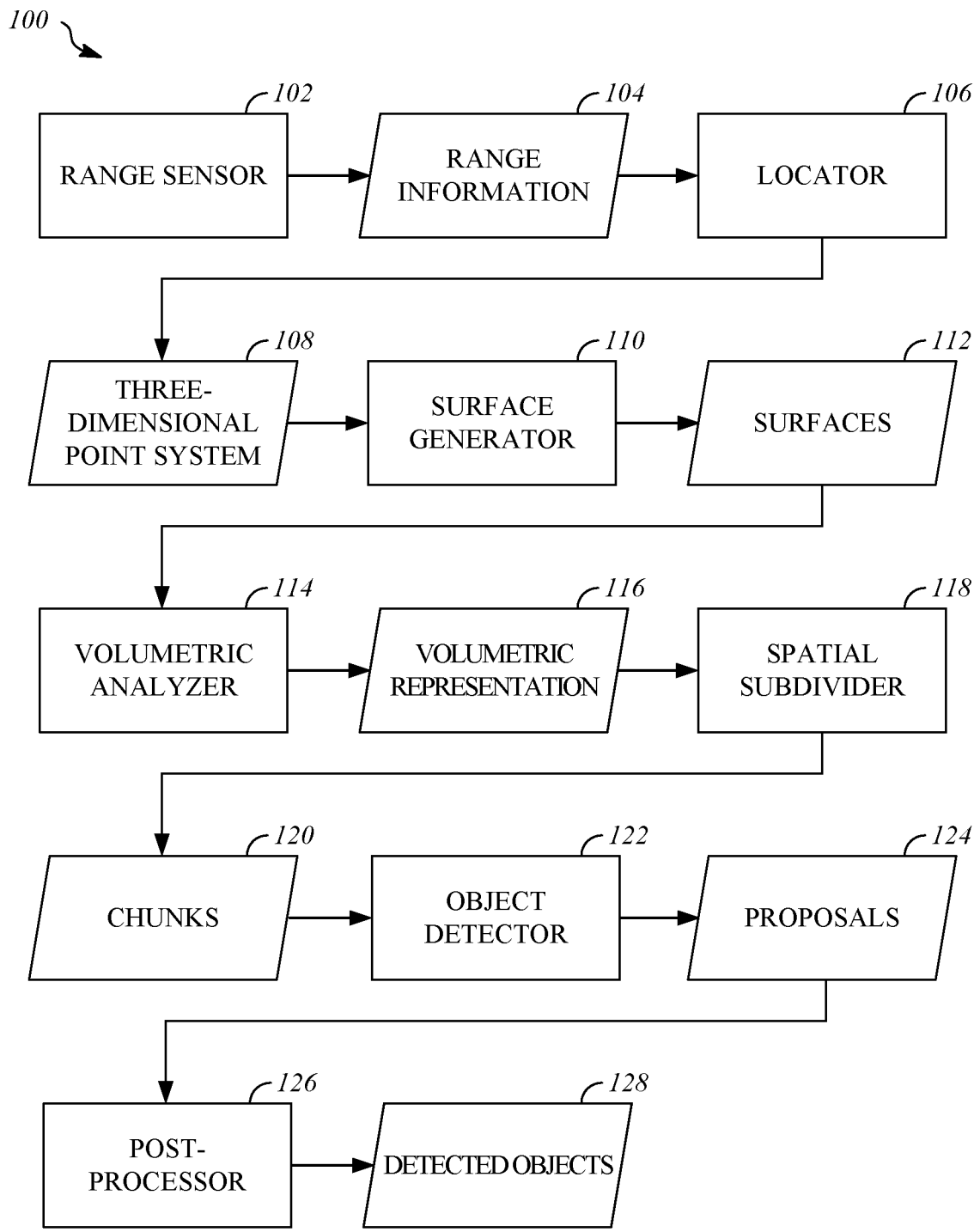
FIG. 1 is an illustration that shows an example of a system for three-dimensional object detection.

FIG. 1 is an illustration that shows an example of a system 100 for three-dimensional object detection. The system 100 may be implemented, in part, using a computing device of any type, such as a computing device that includes a memory, a processor, and program instructions that are stored in the memory and cause the processor to perform actions when executed.

The system 100 includes a range sensor 102 that generates range information 104. The range information indicates distance between the range sensor 102 and objects near the range sensor, and may generate multiple distance values corresponding to different locations or portions within a field of view of the range sensor 102. The range sensor 102 can be any type of sensor that is able to generate information that indicates that distance from the sensor to objects in the environment surrounding the sensor. As examples, the range sensor 102 can be a LIDAR sensor, a RADAR sensor, a laser range sensor, a stereoscopic sensor, a structured light sensor, or any other type of sensor that is able to generate information that indicates that distance from the sensor to objects in the environment. In some implementations, two or more range sensors 102 can be used to generate the range information 104. In some implementations, the range information 104 can include sensor information from multiple sampling periods, such as more information from more than one rotation in implementations in which the range sensor 102 is a rotating LIDAR sensor.

The range information 104 can include, for each of numerous distance measurements, information that indicates or can be used to calculate the location of the point being measured, such as angular orientation of a ray corresponding to the measurement relative to the range sensor 102. The range information 104 may also be referred to herein as distance information.

The range sensor 102 has a field of view in which measurements are taken. In some implementations, the sensing elements of the range sensor 102 are fixed relative to a supporting structure (e.g., a vehicle). In other implementations, the sensing elements of the range sensor 102 are moved over time relative to the supporting structure, such as by sweeping in a circular pattern.

The range information 104 generated by the range sensor 102 includes numerous values that each correspond to a spatial location within the field of view of the range sensor 102. For example, the range information 104 may include sets of values that each correspond to a spatial location, with each set of values including one or more location values that identify the location, such as by angular measurements relative to the range sensors and a distance value relative to the range sensor, or by two-dimensional coordinates, such as X and Y coordinates that locate a range measurement within the field of view of the range sensor 102 along with the distance value of the location relative to the range sensor 102. The distance value may, in some implementations, be represented by a time-of-flight measurement that indicates the time elapsed between emission of a signal and measurement of a reflected signal that correspond to the measurement. The range information 104 may also include information that indicates when the information was generated, such as a timestamp.

Figure 2A:
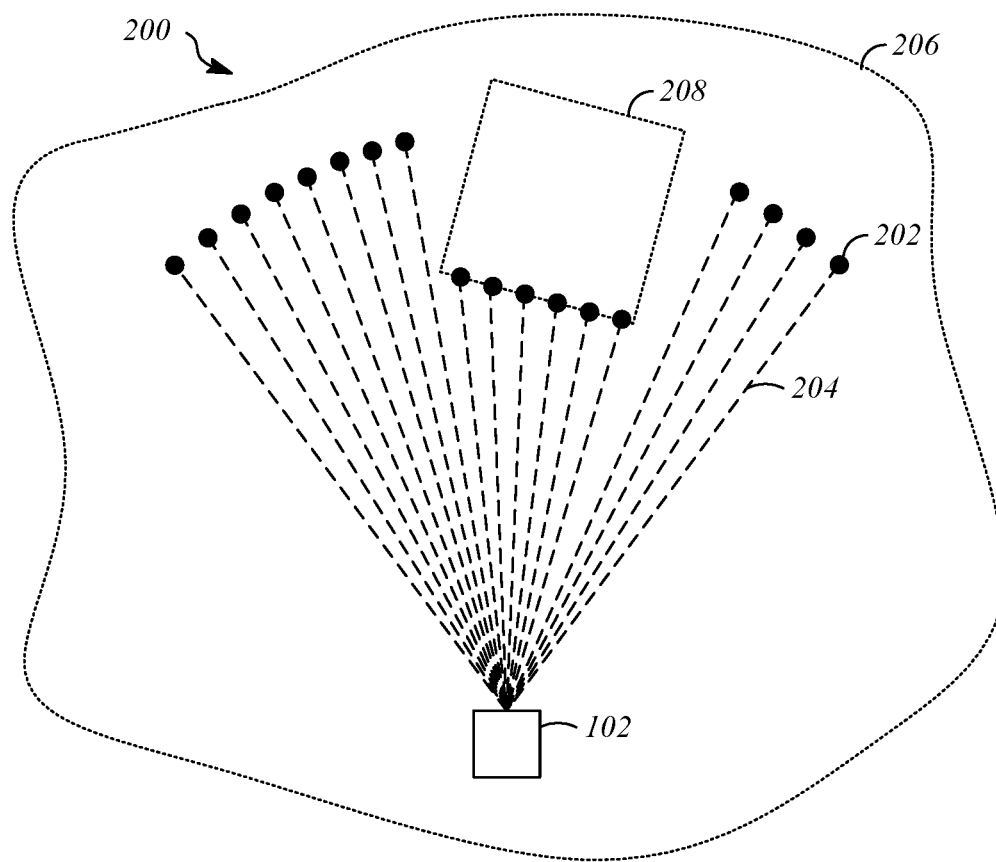
FIG. 2A shows range points in an environment in a top-down view.
Figure 2B:
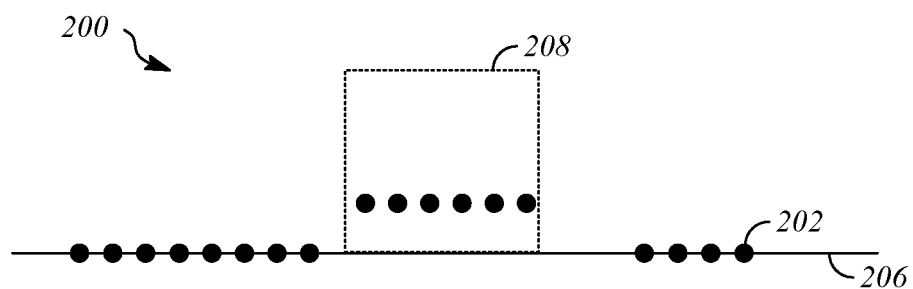
FIG. 2B show the range points in an environment in a front view.

FIGS. 2A-2B show range points 202 in an environment 200 in a top-down view (FIG. 2A) and a front view (FIG. 2B). The range points 202 correspond to measurements that are made by the range sensor 102, each along a respective one of the vectors 204. The measurements represented by the range points 202 are included in the range information 104. The range points 202 represent distance measurements from the range sensor 102 to portions of the environment 200 at which an emitted signal is reflected, such that a portion of the signal returns to the range sensor 102 and can be measured.

The range points 202 can represent incidence of a corresponding one of the vectors 204 with, for example, a ground surface 206 or an object 208 that extends upward from the ground surface 206. It should be noted that presence of the ground surface 206 and the object 208 is not detected directly by the range points 202, but instead, the range points 202 are interpreted to determine their significance, as will be discussed.

The vectors 204 each have a known angular orientation, for example, based on knowledge of the orientation of the portion of the range sensor 102 that emitted the signals that correspond each of the range points 202. The location of each of the range points 202 is a function of the angular orientation of the corresponding one of the vectors 204 and the distance of the corresponding one of the range points 202 from the range sensor 102, which can be determined, for example, by measuring time-of-flight of the corresponding signal.

With further reference to FIG. 1, the range information 104 is provided as an input to a locator 106. The locator 106 processes the range information 104 and determines locations associated with each of the measurements in a three-dimensional reference system. The three-dimensional reference system can be, as examples, latitude and longitude coordinates, XYZ coordinates relative to a fixed location, or XYZ coordinates relative to a moving reference frame (e.g., a vehicle). Well known geometric techniques can be utilized to determine the locations of the measurements from the range information in the three-dimensional reference system, using operations analogous to those involved in converting polar coordinates to Cartesian coordinates, and determining locations in a first reference frame corresponding to locations in a second reference frame. For example, the distances and the angular orientations associated with the range points 202 and the vectors 204 (FIGS. 2A-2B) can be utilized as inputs data for this determination. Each of the locations determined by the locator 106 can be represented as a point in three-dimensional space, and each of these points represents a location in the environment around the range sensor 102 where a signal was reflected, for example, as a result of striking an object that is present in the environment. These points can be collected in a three-dimensional point system 108, which is output and/or updated by the locator 106. Thus, the three-dimensional point system 108 may include a large number of locations at which signals where reflected, indicating the possible presence of a surface (i.e., a "candidate surface") and/or the possible presence of an object (i.e., a "candidate object"). The three-dimensional point system 108 may be referred to as a point cloud. In implementations where the range sensor 102 is a LIDAR device, the three-dimensional point system 108 may be referred to as a LIDAR point cloud.

Figure 3:
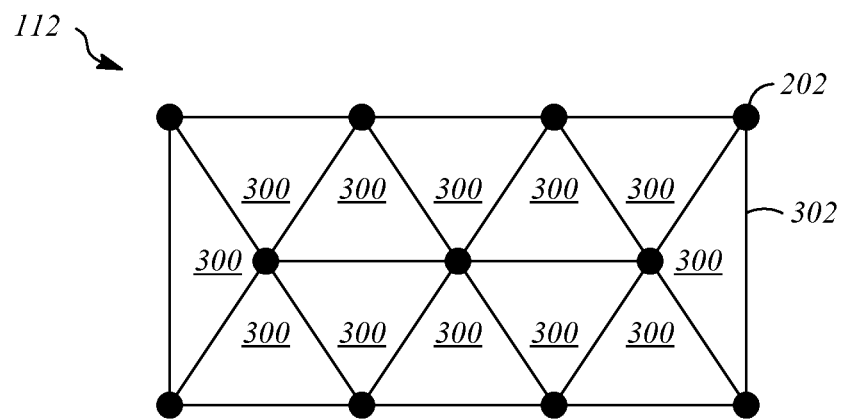
FIG. 3 shows a surface formed by defining triangular surface portions using the range points.

The three-dimensional point system 108 is provided by the locator 106 as an input to other systems including a surface generator 110. The surface generator 110 generates one or more surfaces 112 in three-dimensional spaced based on the three-dimensional point system 108. Well-known algorithms exist for defining surfaces from points. For example, a group of points that are within a threshold distance of each other can be analyzed, and triangular surface portions can be identified using sets of three points from the three-dimensional point system. Adjacent surface portions (i.e., surface portions that share a common edge) can be combined into a single surface. For example, FIG. 3 shows the surface 112 formed by defining triangular surface portions 300 using three of the range points 202, with each of the triangular surface portions 300 being bounded by three edges 302 that are defined between pairs of the range points 202. The triangular surface portions 300 combine to represent the surface 112 as a triangular mesh, which should correspond to a physical surface in the environment 200. The triangular mesh can be a polygon mesh that includes a set of triangles that are connected by their common edges or corners.

During processing of the three-dimensional point system 108 by the surface generator, some of the measurements included in the three-dimensional point system 108 can be ignored, and no surfaces are generated for them. For example, the three-dimensional point system 108 can be filtered based on elevation to eliminate points corresponding to a ground plane (e.g., a roadway surface) if the system 100 is configured to detect objects that are located above the ground plane.

With further reference to FIG. 1, the surfaces 112 are provided as an input to a volumetric analyzer 114. The volumetric analyzer 114 analyzes the surface 112 and outputs a volumetric representation 116. The volumetric representation 116 is a data transformation of the three-dimensional point system 108. The volumetric representation 116 organizes information regarding presence of the surfaces 112 by defining discrete areas in space, and encoding information regarding the positions of the surfaces 112 relative to the discrete areas in space. As will be explained herein, the data transformation performed using the three-dimensional point system 108 to generate the volumetric representation 116 may include dividing a three-dimensional space areas, which may have predetermined spatial resolutions (e.g., 0.1 m in each direction), and associating the space areas within information (e.g., data values) that indicates presence or proximity of a possible surface and/or object, representing the surfaces from the sensor information via the space portions using a triangular mesh, and encoding the represented surfaces with data values. As will be explained herein, the presence or proximity of a possible surface and/or object can be encoded using data values represented using a truncated signed distance function or a similar technique.

Figure 4A:
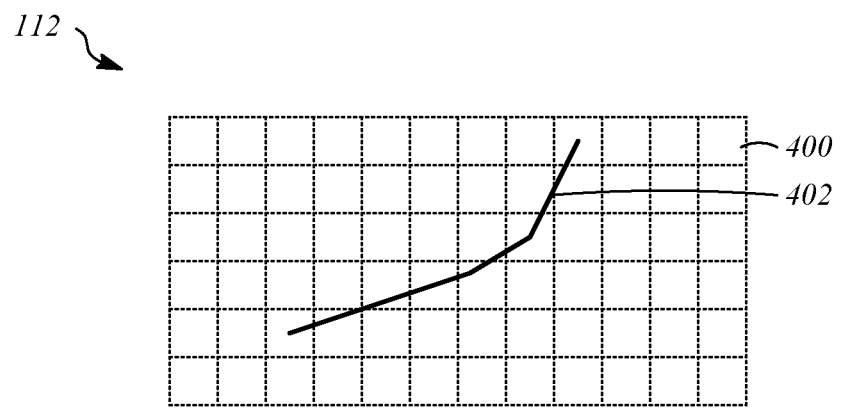
FIG. 4A shows a top view of space portions positioned relative to a surface

The volumetric representation 116 may be used to indicate areas in which portions of the surfaces 112 are present. For example, FIG. 4A shows a top view of space portions 400 positioned relative to a first surface 402 from the surfaces 112. The space portions 400 are volumetric areas that are used to define the volumetric representation 116. As an example, the space portions 400 may be voxels. The space portions 400 are each associated with a location, and that location can be expressed and/or encoded using data values. (e.g., XYZ location coordinates). The spatial resolution of the space portions 400 can be 0.1 meters (m) in each of the x-dimension, the y-dimension, and the z-dimension (i.e., voxel size of 0.1 m×0.1 m×0.1 m).

Figure 4B:
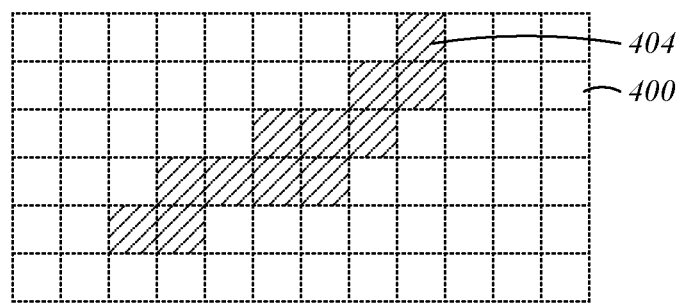
FIG. 4B shows a top view of the space portions in which a group of the space portions are designated as filled space portions.

For ones of the space portions 400 where the first surface 402 is present, information is associated with them to indicate presence of the first surface 402. FIG. 4B shows a top view of the space portions 400 in which a group of the space portions 400 (which are shaded in FIG. 4B), are designated as filled space portions 404, based on the presence of the first surface 402 with the filled space portions 404.

Figure 4C:
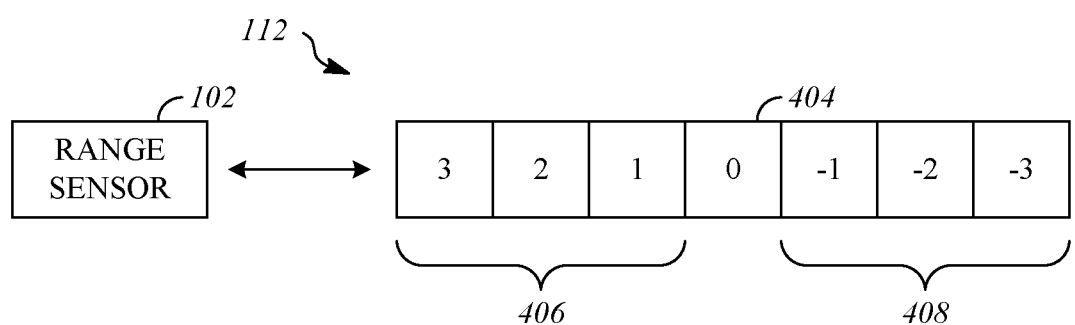
FIG. 4C is an illustration that shows additional data values that are associated with the space portions.

To facilitate further processing, as will be explained herein, the volumetric representation 116 may be augmented to include information that indicates, for each of the space portions 400, proximity to one of the filled space portions 404 where the first surface 402 or another one of the surfaces 112 is present. FIG. 4C is an illustration that shows additional data values that are associated with space portions 400 of the volumetric representation 116. The additional data values are encoded for the space portions 400 that are within a threshold distance (e.g., number of space portions away from) one of the filled space portions 404.

The additional data values can indicate the distance of each of the space portions 400 from the filled spaced portion (or voxels) associated with the one or more surfaces hit by the projection. In the illustrated example, a first group 406 of the space portions 400 is located on a first side of the filled space portion 404, between the range sensor 102 and the filled space portion 404, and are associated with positive-signed data values (e.g., 1, 2, 3) that each represent a distance from the filled space portion 404. The distances represented by the additional data values are measured in terms of the space portions 404, and use of positive values indicates that the first group 406 is located in front of the filled space portion 404 as viewed from the range sensor 102. A second group 408 of the space portions 400 is located on a second side of the filled space portion 404, such that the filled space portion 404 is positioned between the range sensor 102 and the second group 408 of the space portions 400, and the second group 408 of the space portions 400 are associated with negative-signed data values (e.g., −1, −2, −3) that each represent a distance from the filled space portion 404. The distances represented by the additional data values are measured in terms of the space portions 404, and use of negative values indicates that the second group 408 is located behind the filled space portion 404 as viewed from the range sensor 102.

In the illustrated example, the first group 406 and the second group 408 each include three of the space portions 400, and the space portions 400 that are more than three units away from the filled space portion 404 (or other filled space portions) may lack a data value or may be encoded with a data value indicating that they are located greater than the threshold distance from the filled space portion 404. In addition, a number less than three or a number more than three can be selected for the number of additional data values that are generated around the filled space portion 404 and associated with the space portions 400 from the first group 406 and the second group 408.

The volumetric representation 116 can, in some implementations and usage scenarios, include a very large amount of data. To allow for efficient processing of the volumetric representation 116 in subsequent operations, the volumetric representation 116 can be processed into portions that can be analyzed separately. In the illustrated example, the volumetric representation 116 is input to a spatial subdivider 118. The spatial subdivider 118 processes the volumetric representation 116 into chunks 120. The chunks 120 are portions a three-dimensional representation of sensor data, with each of the chunks including information from a contiguous area of the three-dimensional representation. In the illustrated example, the chunks 120 are portions of the volumetric representation 116, and each of the chunks 120 includes information from a contiguous spatial area of the volumetric representation 116.

Defining the chunks 120 using the spatial subdivider 118 is an optimization technique that breaks down a large data set associated with a three-dimensional space (e.g., the volumetric representation 116, which is based on the three-dimensional point system 108) into smaller portions. The chunks 120 can then subsequently be processed individually to detect three-dimensional objects, as will be described further herein. This optimization technique limits the amount of space and processing power required to detect the three-dimensional objects. Thus, instead of processing the entirety of the volumetric representation 116 at once, the chunks 120 can be processed separately.

In addition to saving overall processing resources, analyzing the volumetric representation 116 in the form of the chunks 120 allows the chunks 120 to be analyzed in a desired order (e.g., according to a prioritization schedule). As one example, analysis of the chunks 120 in a certain location can be prioritized ahead of analysis of other ones of the chunks 120 based on previous detection of an object in that location. As another example, the chunks 120 in areas corresponding to previous detection of an object (e.g., prior detection of an object within a predetermined time period) can be analyzed at a higher frequency relative to other ones of the chunks 120 in areas that do not correspond to previous detection of an object (e.g. no prior detection of an object within the predetermined time period). As another example, analysis of the chunks 120 in a certain area of the volumetric representation 116 (e.g., the front or the center). The prioritized area may have been identified as having a greater probability of identifying an object of interest (e.g., identifying a moving object such as a vehicle as opposed to a fixed structure such as a building).

In addition, by breaking the three-dimensional space down into the chunks 120 and then associating the chunks 120 with the volumetric representation that has been generated, the system can receive additional training data to optimize the detection of various objects. For example, if an object such as a vehicle is detected in one of the chunks 120 with a certain orientation (e.g., the vehicle is pointed in a certain direction), then the system can optimize detection of similar objects in adjacent chunks by requiring the identification of similar orientations because of traffic requirements (i.e., vehicles travel down a similar direction on roadways, etc.).

The spatial subdivider 118 may define the chunks 120 by defining a spatial area for each of the chunks 120, and including information from the volumetric representation 116 from the spatial areas in the corresponding ones of the chunks 120. The spatial areas may be defined using a chunk size and a rotation step. The chunks 120 can have similar chunk sizes and rotation steps or various combinations. The spatial areas may also be defined to provide a desired spatial overlap, such as a 50% spatial overlap, no overlap or any other desired spatial overlap, based on characteristics of the environment 200, previously detected objects, characteristics of the volumetric representation 116, or any other factor.

Figure 5:
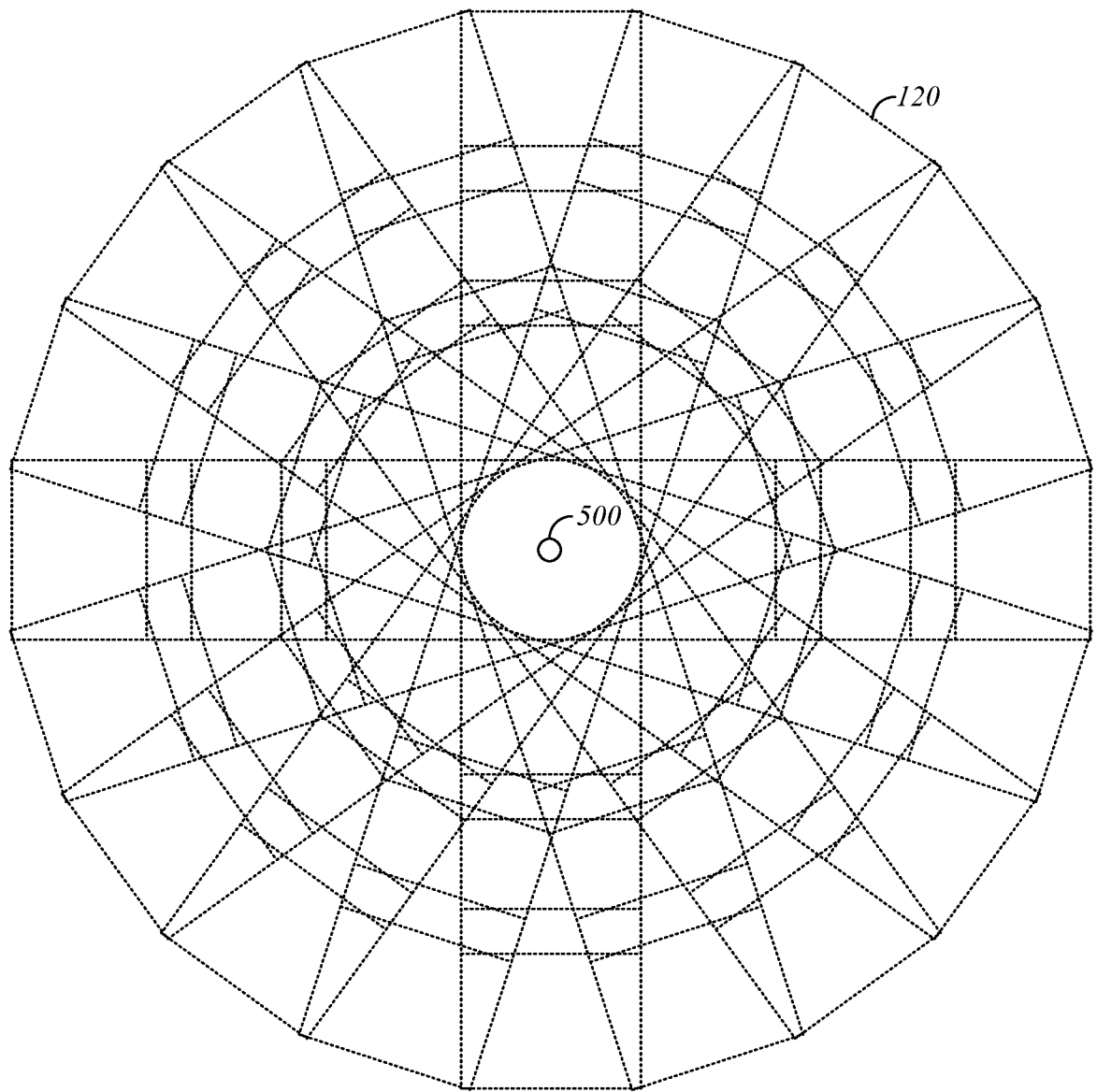
FIG. 5 shows an example of chunks arranged around a center point.

In addition, the chunks 120 or groups of the chunks 120 can be overlapped by a predetermined percentage or not overlapped at all based on characteristics of the three-dimensional space being spatially subdivided. FIG. 5 shows an example of chunks 120 arranged around a center point 500, which may correspond to a location of the range sensor 102. In the illustrated example, the chunk size is 20.8 m×20.8 m×5.0 m, the rotation step is 18 degrees relative to the center point 500, and the overlap of adjacent pairs of the chunks 120 is at least 50%.

The chunks 120 are provided to an object detector 122 as inputs. The chunks 120 may be analyzed in any order. For example, the chunks 120 may be analyzed according to a priority schedule as described previously. The chunks 120 may be analyzed serially or in parallel. As will be explained herein, the object detector 122 outputs proposals 124 as outputs, where the proposals include, for one or more locations in the chunk 120 or other input data, a probability that the center point of an object, as represented by bounding box having a size and a rotation, is at that location.

Figure 6:
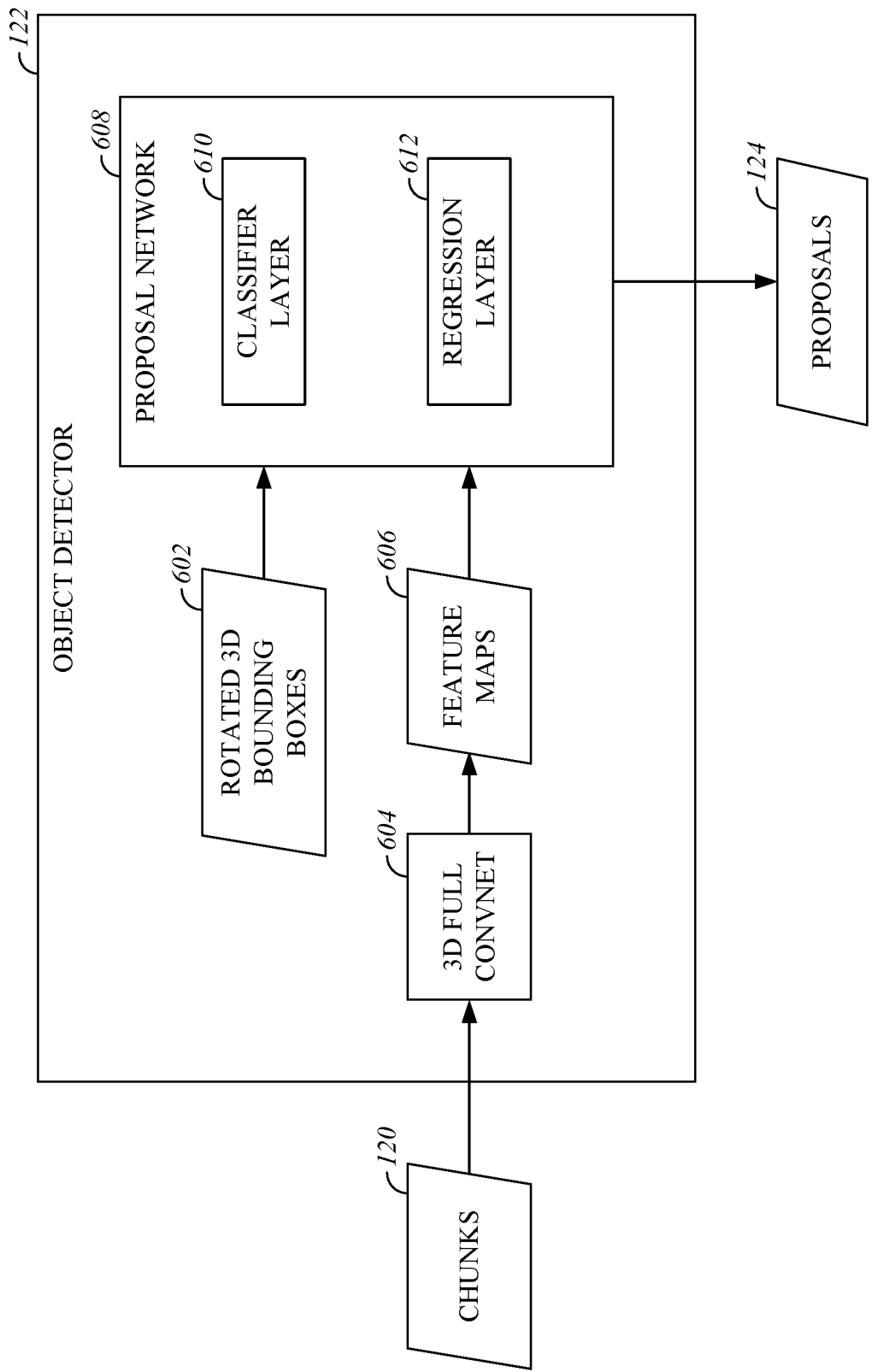
FIG. 6 is an illustration that shows an object detector according to a first example.

FIG. 6 is an illustration that shows the object detector 122 according to a first example. The object detector 122 receives a three-dimensional input that represents positions of surfaces in three-dimensional space. In the illustrated example, the object detector 122 receives one of the chunks 120 as the three-dimensional input, and additional ones of the chunks 120 are processed in the same manner. Other types of three-dimensional inputs can be utilized. As an example, the volumetric representation 116 could be analyzed without subdividing it into the chunks 120.

The object detector 122 analyzes the chunks 120 using bounding box definitions, such as rotated three-dimensional bounding boxes 602. The rotated three-dimensional bounding boxes 602 specify properties for bounding boxes that can be used to represent object locations, such as a width, a height, a length, and a rotation. As an example, the rotated three-dimensional bounding boxes 602 can include two different sizes of bounding box, such as a first bounding box and a second bounding box that have a common height and width, but differ in length. Each of these bounding box sizes is included at four different possible rotational orientations, such that the rotated three-dimensional bounding boxes 602 in this example includes a set of eight different bounding boxes. As will be explained herein, the object detector 122 produces outputs that can be used to position the bounding boxes relative to the three-dimensional point system 108.

The object detector 122 includes a previously-trained machine learning system that is operable to identify features (i.e., object features) in the input data, such as the chunks 120, that are relevant to determining the locations, sizes, and rotations of objects that are represented in the input data. In the illustrated example, the machine learning system is a ConvNet 604. The ConvNet 604 is a three-dimensional full convolutional neural network, which is a type of feed-forward artificial deep neural network (DNN). The ConvNet 604 includes multiple layers that each include filters, which may also be referred to as convolution kernels. Each filter processes a portion of the chunk 120, which may correspond to one or more of the space portions 400 of the volumetric representation 116. The information used by each filter can include information from other portions of the chunk 120, such as portions within a three-dimensional window that surrounds the portion analyzed. For identification of large objects, the ConvNet 604 a larger receptive field using 3D dilated convolution operations.

The filters of the ConvNet 604 have learned behaviors such that they activate when a specific type of feature is detected at the location being analyzed. The behaviors are learned using training data. For example training data for ConvNet 604 can include numerous (e.g., thousands) of samples in which the ConvNet 604 is provided with input data similar to the chunks 120 along with information that describes the output that the ConvNet 604 would be expected to produce in response to the input, namely the three-dimensional position, size, and rotation of a bounding box (e.g., according to the definitions of the rotated three-dimensional bounding boxes 602) that is placed at the location of an object and rotated according to the object. This training data allows the ConvNet 604 to learn features of the objects that are present in the volumetric representations that are included in the training data. Thus, in a system in which the objects being detected are vehicles, vehicle features will be included in the training data at the locations where the bounding boxes are placed, the filters of the ConvNet 604 will learn these features, and, subsequent to being trained, will activate when similar features are found in input data such as the chunks 120.

Processing of the chunks 120 by the ConvNet 604 results in one or more feature maps 606. The feature maps 606 include features that are defined as a result of activation of the filters of the ConvNet 604, and represent features that are useful for determining the location, size, and/or rotation of the rotated three-dimensional bounding boxes 602. As one example, a single feature map can be output by the ConvNet 604, including features that are relevant to all of the bounding box variations included in the rotated three-dimensional bounding boxes 602. As another example, multiple feature maps (e.g., eight) can be output by the ConvNet 604, with each feature map corresponding to a specific one of the rotated three-dimensional bounding boxes 602 (e.g., a specific height, width, depth, and rotation).

The feature maps 606 each include portions that correspond spatially to portions of the input data, such as the chunk 120 that is being processed. As one example, the feature maps could include a number of portions (i.e., data corresponding to locations having x, y, and z coordinates) that is equal to the number and spatial arrangement to that of the space portions 400 that are included in the chunk 120. In another example, the ConvNet 604 can down-sample the input data by a predetermined factor. For example, if the chunk 120 space portions 400 having a spatial resolution of 0.1 m, a 4×4×4 cubic area of the chunk 120 can be down-sampled in three-dimensions by a factor of four, resulting in a spatial resolution of 0.4 m for portions of the feature map 606 that is output by the ConvNet 604. Different factors could be used for down sampling by the ConvNet 604, resulting in different spatial resolutions for the portions.

The feature maps 606 and the rotated three-dimensional bounding boxes 602 are analyzed using a proposal network 608 that includes a classifier layer 610 and a regression layer 612. The proposal network 608 is utilized as a prediction mechanism to generate two outputs (a first output for scores and a second output for values) that describe candidate objects and corresponding information (i.e., location, shape/size, rotation), which are output as the proposals 124.

The proposal network 608 determines, for locations in the chunk 120 (or other spatial area being analyzed), a probability that the center point of an object, as represented by one of the rotated three-dimensional bounding boxes, is at that location. The locations, bounding box sizes, and bounding box rotations are output as the proposals 124, as will be explained further herein.

For each spatial location described by feature maps 606, the classifier layer 610 compares each of the rotated three-dimensional bounding boxes 602 to features present in the feature map 606 at that spatial location. One or more scores are generated by the classifier layer 610 for each of the three-dimensional bounding boxes 602 at each of the locations represented in the feature maps 606. The scores are probabilities that indicate, for each of the bounding boxes from the rotated three-dimensional bounding boxes 602, whether the bounding box matches the features from the feature map 606 at a particular location. For each location at which there is a probability that an object is present, the scores generated by the classifier layer 610 can be incorporated in the proposals 124.

As an example, the rotated three-dimensional bounding boxes 602 can include bounding boxes that have varying sizes (e.g., defined by variable k) and have varying rotations (e.g., defined by variable r), and a total number of the bounding boxes from the rotated three-dimensional bounding boxes 602 is defined as $k*r$. Therefore, if there are two size options ($k=2$) and four rotation options ($r=4$, at 45-degree rotations), the total number of the rotated three-dimensional bounding boxes 602 is eight. If one score is generated for each of the rotated three-dimensional bounding boxes 602, then $k*r$ scores are generated for each of the locations represented in the feature maps 606. As an example, a single probability score may be generated at each location for each of the bounding boxes, where the single probability score represents the probability that the particular bounding box should be placed at that location. If two scores are generated for each of the rotated three-dimensional bounding boxes 602, then $2*k*r$ scores are generated for each of the locations represented in the feature maps 606. As an example, a first probability score may be generated at each location for each of the bounding boxes representing the probability that the particular bounding box should be placed at that location to represent a movable object (also referred to as a foreground object), and a second probability score may be generated at each location representing the probability that a non-movable object (also referred to as a foreground object) is present at the location. Thus, a first output generated by the classifier layer 610 can include information that represents a probability of presence or absence of an object at each location, as well as the likely size and rotation of the object.

The regression layer 612 generates a second output based on the first output from the classifier layer and/or based on the rotated three-dimensional bounding boxes 602 and the feature maps 606. The data values output by the regression layer describe the bounding box, its position, and its rotation for each the candidate objects determined by the classifier layer 610. For example, the classifier layer 610 can determine initial values that describe the boxing box for each candidate object, and the regression layer 612 can utilize additional information from the feature maps 606 to revise these initial values. In one implementation, the regression layer 612 outputs seven data values including x, y, and z coordinates (representing a center location of the candidate object) and width, height, length, and rotation measurements (representing a bounding box around a candidate object). A total number of values per location in the feature map is given by the can be determined per the equation: $7*k*r$, where k represents the number of bounding box sizes and r represents the number of bounding box rotations.

Subsequent to processing by the classifier layer 610 and the regression layer 612, the proposals 124 are output by the object detector 122. The proposals 124 can include a proposal for each of multiple candidate objects. The proposals 124 can include a center location (e.g., given by x, y, z location coordinates) associated with each of the candidate objects and a bounding box (that includes a width, length, height and rotation measurements) for each of the candidate objects.

Figure 7:
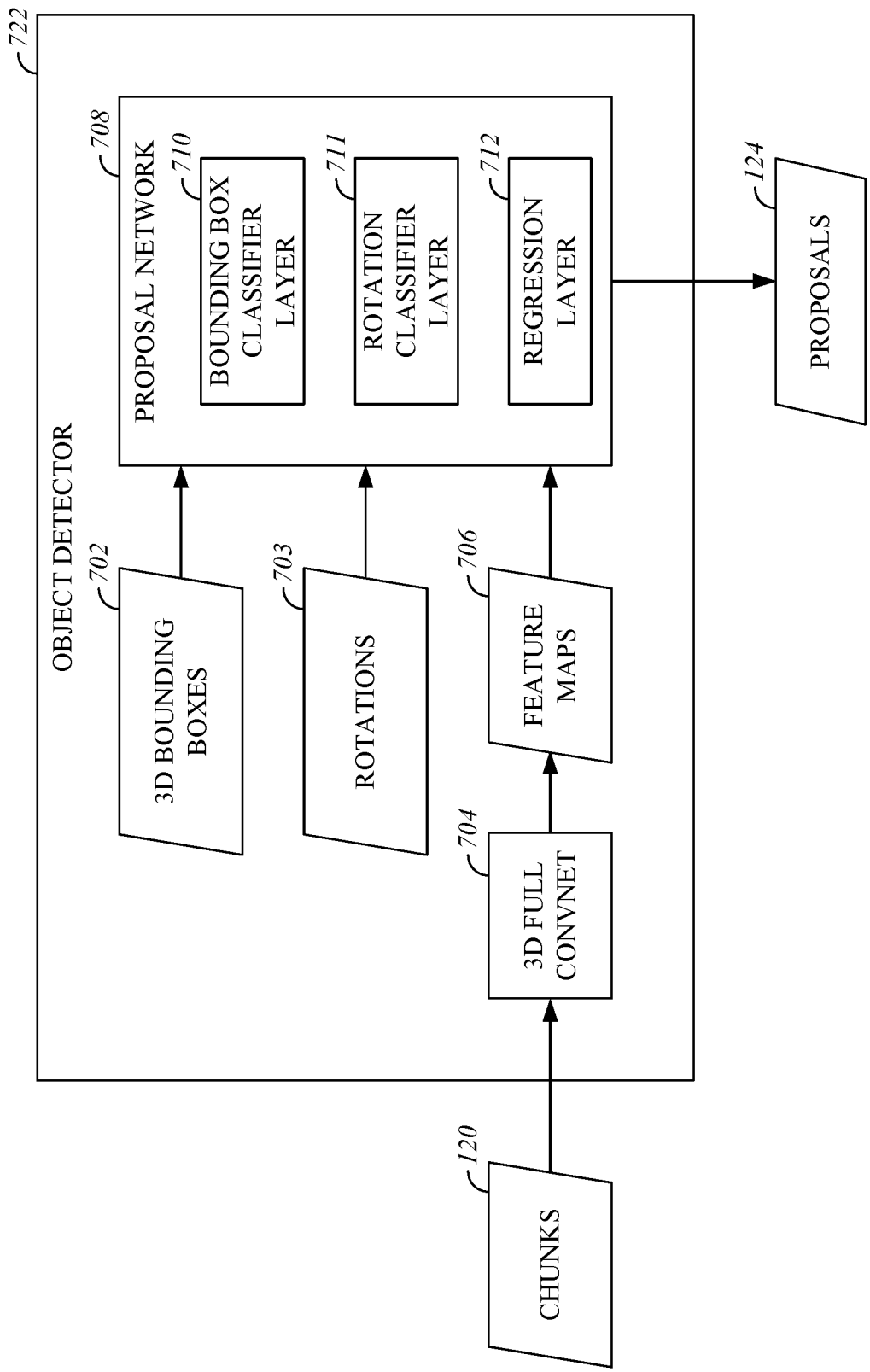
FIG. 7 is an illustration that shows the object detector according to a second example.

FIG. 7 is an illustration that shows an object detector 722 according to a second example. The object detector 722 can be utilized in the system 100 in place of the object detector 122, and is similar to the object detector 122 except as described. The object detector 722 receives an input such as the chunks 120, in the manner described with respect to the object detector 122.

The object detector 722 analyzes the chunks 120 using bounding box definitions that include three-dimensional bounding boxes 702 and rotations 703. The three-dimensional bounding boxes 702 are define unrotated bounding boxes and the rotations 703 rotation definitions that are separate from the unrotated bounding box definitions. The three-dimensional bounding boxes 702 are similar to the three-dimensional bounding boxes 602, except that a single rotational orientation is included for each bounding box size. The rotations 703 describe multiple rotational orientations, such as four orientations at 45-degree angular spacings.

The object detector 722 includes a ConvNet 704, which is similar to the ConvNet 604, except that it is trained using the three-dimensional bounding boxes 702 and the rotations 703. The feature maps 706 are generated to identify features that are relevant to identifying the three-dimensional bounding boxes 702 and the rotations 703, and may include a separate feature map for each of the three-dimensional bounding boxes 702 and each of the rotations 703. The feature maps 706 are otherwise as described with respect to the feature maps 606.

The feature maps 706, the three-dimensional bounding boxes 702, and the rotations 703 are analyzed using a proposal network 708, which is similar to the proposal network 608 except as described. The proposal network 708 includes a bounding box classifier layer 710, a rotation classifier layer 711, and a regression layer 712. The proposal network 708 is utilized as a prediction mechanism to generate three outputs (a first output for bounding box scores, a second output for rotation scores, and a third output for values) that describe candidate objects and corresponding information (i.e., location, shape/size, rotation), which are output as the proposals 124. By separating the functions of the bounding box classifier layer 710 and the regression layer 712, processing complexity is reduced.

The bounding box classifier layer 710 is similar to the classifier layer 610, except that it utilizes the three-dimensional bounding boxes 702, which do not include multiple rotations. This reduces the number of scores output by the bounding box classifier layer 710 as compared to the classifier layer 610. Similar to the classifier layer 610, for each location at which there is a probability that an object is present, as represented by the three-dimensional bounding boxes 702, the scores generated by the bounding box classifier layer 710 can be incorporated in the proposals 124. Thus, a first output generated by the bounding box classifier layer 710 can include information that represents a probability of presence or absence of an object at each location and the likely size of the object, but not the rotation of the object.

The rotation classifier layer 711 is similar to the bounding box classifier layer 710, except that it analyzes the rotations 703 relative to the feature maps 606, as opposed to analyzing the three-dimensional bounding boxes 702. For each location at which there is a probability that an object is present, scores generated by the rotation classifier layer 711 can be incorporated in the proposals 124 to indicate, for each of the possible rotations, the probability that each corresponds to the rotation of an object in the environment. Thus, a second output generated by the rotation classifier layer 711 can include information that represents a probability for each possible rotation of the object.

The regression layer 712 generates a third output based on the first output from the bounding box classifier layer 710, the second output from the rotation classifier layer 711, and/or based on the three-dimensional bounding boxes 702 and the feature maps 706. The regression layer 712 otherwise operates in the manner described with respect to the regression layer 612, and the data values output by the regression layer describe the bounding box, its position, and its rotation for each the candidate objects determined by the bounding box classifier layer 710. Thus, the regression layer 712 may output seven data values including x, y, and z coordinates (representing a center location of the candidate object) and width, height, length, and rotation measurements (representing a bounding box around a candidate object). A total number of values per location in the feature maps 706 is given by the can be determined per the equation: 7*k, where k represents the number of bounding box sizes and r represents the number of bounding box rotations.

Subsequent to processing by the bounding box classifier layer 710, the rotation classifier layer 711, and the regression layer 712, the proposals 124 are output by the object detector 722 in the manner described with respect to the object detection system 622.

With further reference to FIG. 1, the proposals 124 are input to a post-processor 126, that utilizes various post-processing techniques to identify a final group of detected objects from the proposals 124. As one example, the candidate objects from the proposals can be evaluated based on their probabilities, and eliminated if their probability is less than a threshold value. As another example, the locations of the center points of the candidate objects can be compared to locations of the surfaces 112, and eliminated if the distance is greater than a threshold value. As another example, the sizes of the candidate objects can be estimated based on the locations of the center points of the candidate objects and the locations of the surfaces 112, and eliminated if one or more dimensions of the size is greater than a maximum value or less than a minimum value. As another example, non-maximum suppression is applied to overlapping candidate objects from the proposals 124, by selecting the prediction that has the highest probability, and eliminating the other overlapping predictions. The post-processor 126 can also utilize cross-modality verification to verify or eliminate candidate objects from the proposals. As one example of cross-modality verification, LIDAR intensity data can be compared to visible spectrum camera images.

Figure 8:
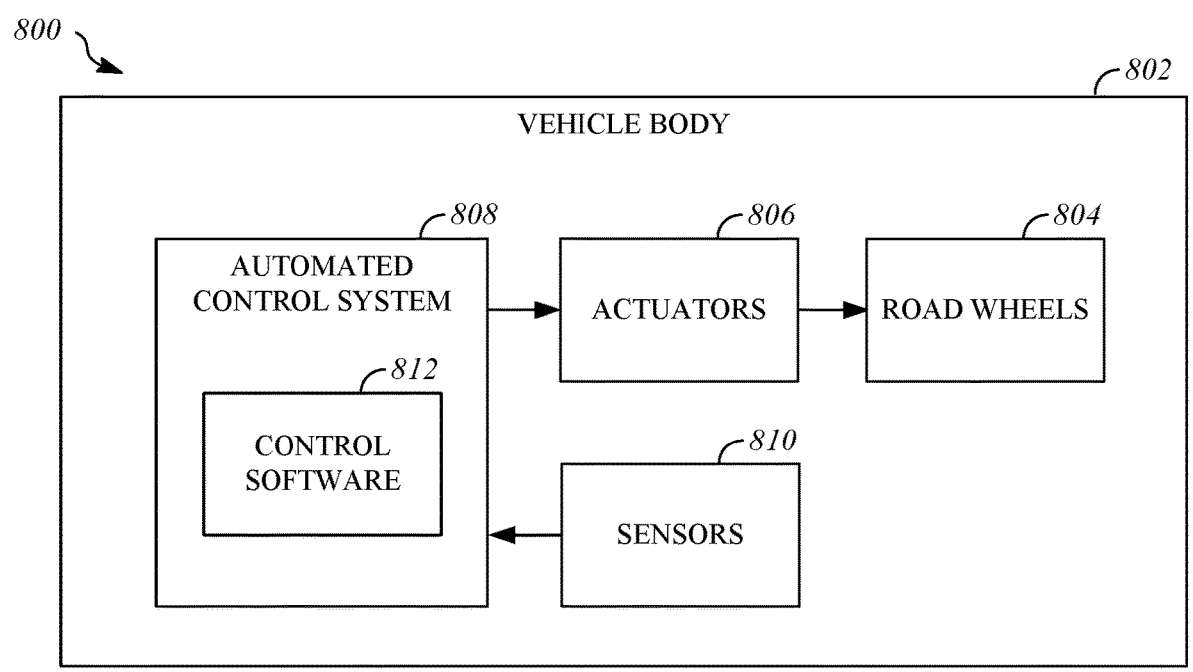
FIG. 8 is a block diagram that shows an example of a vehicle.

FIG. 8 is a block diagram that shows an example of a vehicle 800. The vehicle 800 can implement the methods for three-dimensional object detection described herein. As an example, the vehicle 800 can be configured to detect the three-dimensional positions and rotations of other vehicles using sensor information such as LIDAR point cloud data.

The vehicle 800 can have a vehicle body 802. The vehicle body 802 may include internal structural portions and external portions that are aesthetic and/or structural in nature. As examples, the vehicle body 802 may include one or more of a unibody, a frame, a subframe, a monocoque, and body panels.

The vehicle 800 may be a wheeled vehicle that includes road wheels 804. As an example, the vehicle 800 may include four of the road wheels 804, and other implementations are possible. The road wheels 804 are the portion of the vehicle 800 that contacts the surface on which the vehicle 800 is travelling, and the characteristics of the road wheels 804 are responsible, in part, for the amount of friction available. The road wheels 804 may include tires, such as conventional pneumatic tires formed in part from synthetic rubber, or other friction-enhancing structures may be incorporated in the road wheels 804.

The vehicle 800 includes actuators 806 that cause and control motion of the vehicle 800. Any type and combination of vehicle actuators may be utilized as the actuators 806, including actuators traditionally associated with road-going vehicles, off-road vehicles, aircraft, and watercraft. The actuators 806 may include, as examples, suspension actuators, steering actuators, braking actuators, and propulsion actuators.

The actuators 806 operate in response to control signals from an automated control system 808. The automated control system 808 is configured to output the control signals using data that is received from sensors 810 and optionally from other sources to implement automated control of the vehicle. As will be explained herein, the automated control system 808 can implement motion planning functions that determine a trajectory for the vehicle 800, and actuator control functions that coordinate operation of the actuators 806 to attempt to follow the trajectory. The decision-making functions of the automated control system 808 are implemented using control software 812 that is operable to cause autonomous operation of the vehicle 800, as will be described further herein. The control software 812 may be implemented using a conventional computing device that is provided in the form of computer executable instructions, in the form of specialized hardware such as an application-specific integrated circuit (ASIC) or a field-programmable gate array (FPGA), or a combination of conventional computing devices and/or specialized hardware.

The sensors 810 are in communication with the automated control system 808. The sensors 810 include numerous individual sensing components that may be disposed at various locations around the vehicle 800. Some of the sensors 810 can be incorporated in the actuators 806.

The sensors 810 can include sensing components that are operable to perceive information regarding the environment around the vehicle 800 and output information regarding the environment around the vehicle 800, including objects and obstacles around the vehicle 800. As examples, the sensors 810 can include cameras, radar sensors, and LIDAR sensors. The sensors 810 can also include sensing components that are operable to perceive information regarding operating states and kinematic states of the vehicle 800, such as position sensors, orientation sensors (i.e., pitch, yaw, and roll), linear velocity sensors, angular velocity sensors, linear acceleration sensors, and angular acceleration (i.e. pitch rate change, yaw rate change, and roll rate change) sensors. The sensors 810 may also include sensing elements that receive information from external data sources, such as by receiving receiver for wireless beacon or presence signals broadcast by other vehicles, or by receiving messages from a centralized traffic coordination system.

Figure 9:
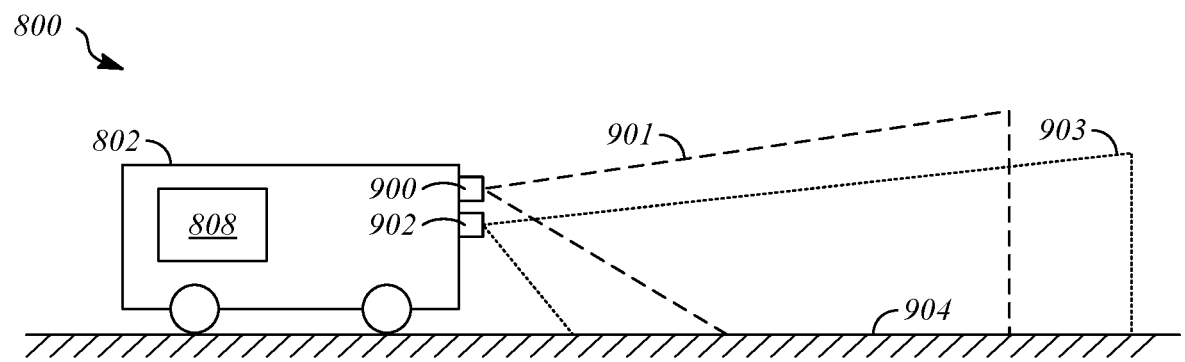
FIG. 9 is an illustration that shows the vehicle.

FIG. 9 is an illustration that shows the vehicle 800. The vehicle 800 includes an image sensor 900 and a range sensor 902. The image sensor 900 and the range sensor 902 are supported by the vehicle 800 and are oriented such that an image sensor field of view 901 of the image sensor 900 and a range sensor field of view 903 of the range sensor 902 at least partially overlap and are oriented toward an area of interest, such as a roadway 904. Information from the image sensor 900 and the range sensor 902 are provided to the automated control system 808, which is operable to process and store information associated with detecting three-dimensional objects.

Figure 10:
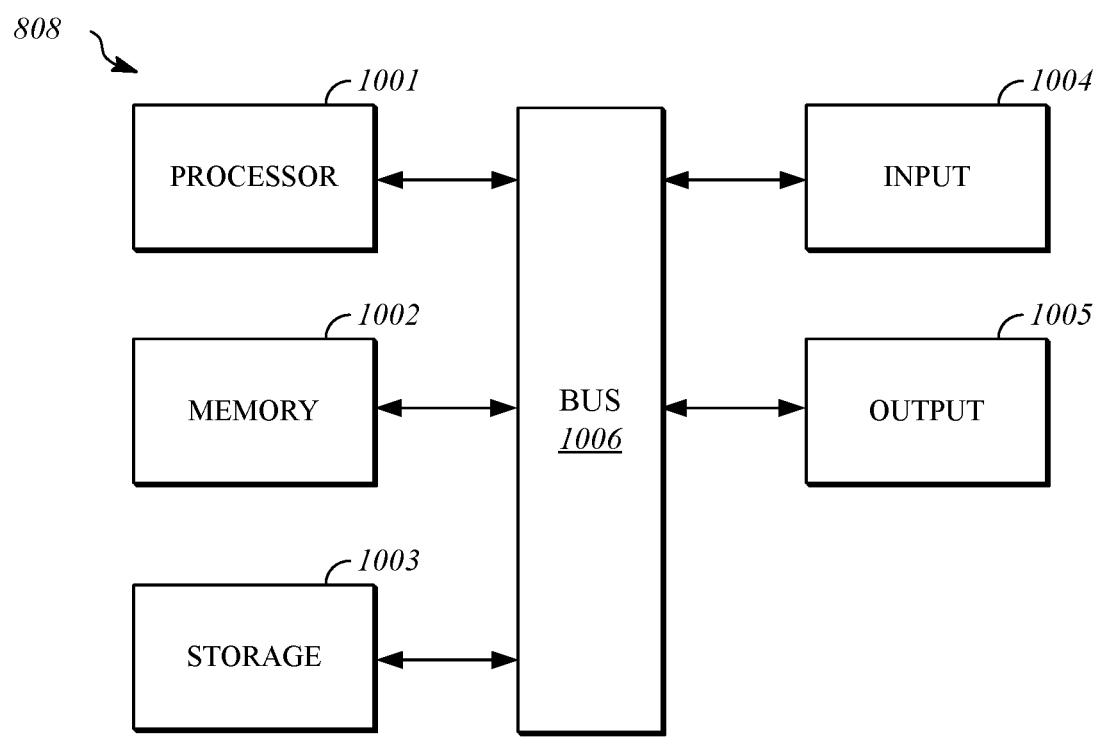
FIG. 10 is an illustration that shows an example of a hardware configuration of an automated control system of the vehicle.

FIG. 10 is an illustration that shows an example of a hardware configuration of the automated control system 808. The automated control system 808 may include a processor 1001, a memory 1002, a storage device 1003, one or more input devices 1004, and one or more output devices 1005. The automated control system 808 may include a bus 1006 or a similar device to interconnect the components for communication. The processor 1001 is operable to execute computer program instructions and perform operations described by the computer program instructions. As an example, the processor 1001 may be a conventional device such as a central processing unit. The memory 1002 may be a volatile, high-speed, short-term information storage device such as a random-access memory module. The storage device 1003 may be a non-volatile information storage device such as a hard drive or a solid-state drive. The input devices 1004 may include any type of human-machine interface such as buttons, switches, a keyboard, a mouse, a touchscreen input device, a gestural input device, or an audio input device. The output devices 1005 may include any type of device operable to provide an indication to a user regarding an operating state, such as a display screen or an audio output.

Figure 11:
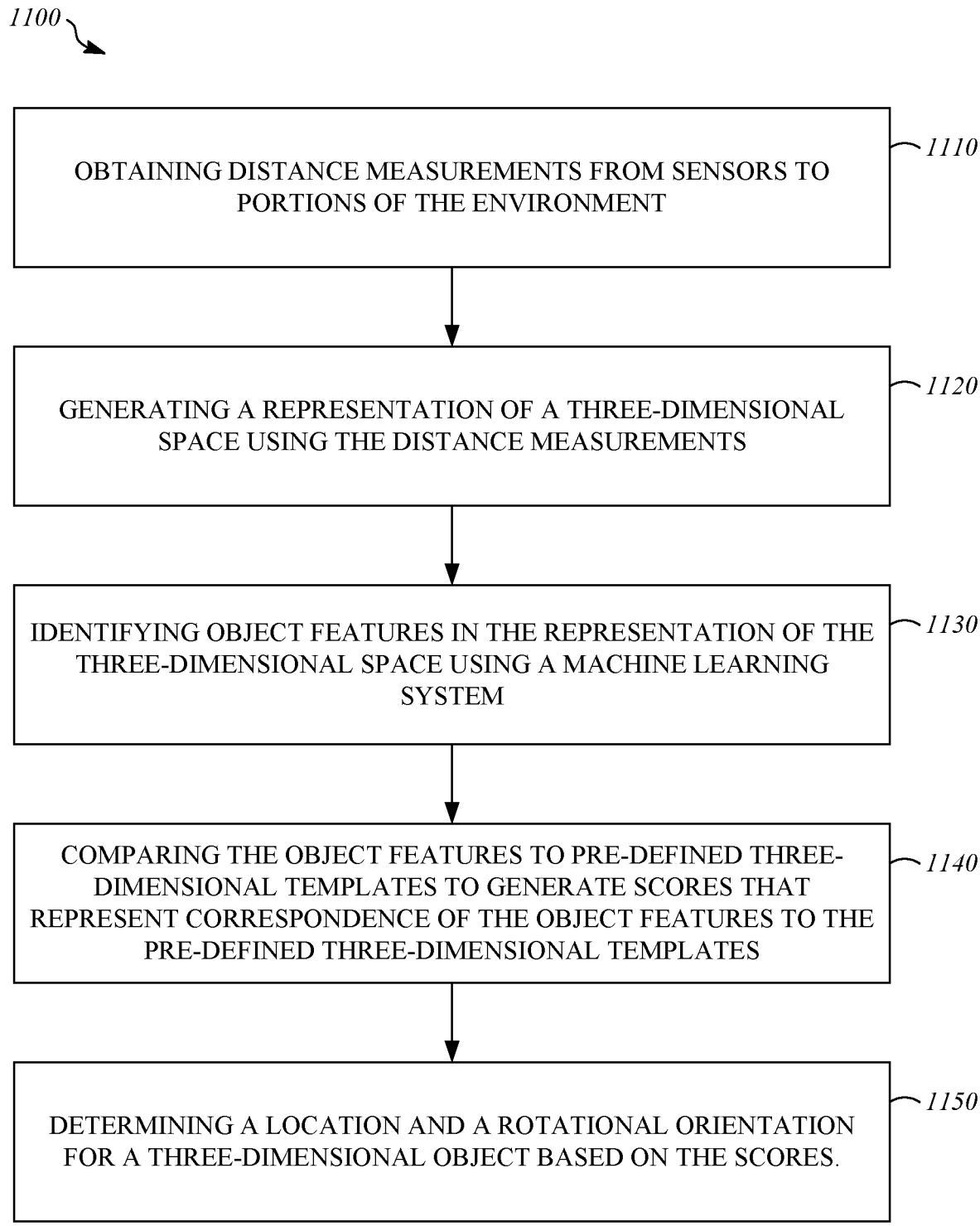
FIG. 11 is flowchart that shows an example of a process for detecting three-dimensional objects.

FIG. 11 is flowchart that shows an example of a process 1100 for detecting three-dimensional objects. The process 1100 can be executed using a computing device such as one or more processors that execute instruction that are stored in memory. In one implementation, the vehicle 800 is used to implement the process 1100, including use of signals from the range sensor 902 and processing by the automated control system. In other implementations, the process 1100 can be implemented directly in hardware, firmware, or software, circuitry, or a combination thereof.

Operation 1110 includes obtaining distance measurements from sensors to portions of an environment. As an example, the environment may be a three-dimensional scene such as the roadway 904. The distance measurements can be obtained from one or more sensors, either directly (e.g. receiving signals from the sensors) or indirectly, for example by accessing the distance measurements from memory or storage, or by receiving the distance measurements from another system. The environment in operation 1110 may be consistent with the description of the environment 200 of FIGS. 2A-2B. The distance measurements in operation 1110 may be consistent with the description of the range information 104 obtained using the range sensor 102 of FIG. 1. As an example, the one or more sensors of operation 1110 can include LIDAR sensors. As an example, the information obtained in operation 1110 can include but is not limited to LIDAR point cloud data, as described with respect to the three-dimensional point system 108, which may be defined from the range information 104 in the manner described with respect to the locator 106.

Operation 1120 includes generating a representation of a three-dimensional space using the distance measurements obtained in operation 1110. The representation of the three-dimensional space be generated, for example, by transforming the distance measurements obtained in operation 1110 into any suitable three-dimensional space representation. The representation of the three-dimensional space may be a volumetric representation in which the three-dimensional space is divided into space portions. As an example, operation 1120 can be performed in the manner described with respect to the locator 106, the surface generator 110, and the volumetric analyzer 114. The representation of the three-dimensional space in operation 1120 may be consistent with the description of the volumetric representation 116 of FIGS. 2A-2B.

Operation 1130 includes identifying object features in the representation of the three-dimensional space that was generated in operation 1120 using a machine learning system. Operation 1130 can be performed in the manner described with respect to the object detector 122. The machine learning system of operation 1130 can be implemented in the manner described with respect to the ConvNet 604 or the ConvNet 704, with the output serving as the features of operation 1130.

Operation 1140 includes comparing the object features that were identified in operation 1130 to pre-defined three-dimensional templates to generate scores that represent correspondence of the object features to the pre-defined three-dimensional templates. The templates of operation 1140 can be or include, as examples, the rotated three-dimensional bounding boxes 602, the three-dimensional bounding boxes 702, and/or the rotations 703. Operation 1140 can be performed in the manner described with respect to the proposal network 608 or the proposal network 708.

In some implementations, the pre-defined three-dimensional templates each include rotated bounding boxes that each have a length value, a width value, a height value, and a rotation value, and operation 1140 includes comparing the object features to the set of pre-defined three-dimensional templates by a classifier layer using the rotated bounding boxes as explained with respect to the classifier layer 610. In some implementations, the pre-defined three-dimensional templates each include unrotated bounding boxes and separate rotation values, the unrotated bounding boxes each having a length value, a width value, and a height value, and operation 1140 includes comparing the object features to the set of pre-defined three-dimensional templates by a first classifier layer using the rotated bounding boxes and by a second classifier layer using the separate rotation values as explained with respect to the bounding box classifier layer 710 and the rotation classifier layer 711.

Operation 1150 includes determining a location and a rotational orientation for a three-dimensional object based on the scores. Operation 1150 can be performed, for example, in the manner described with respect to the proposals 124, the post-processor 126, and/or the detected objects 128. The three-dimensional object may be, as examples, other vehicles, pedestrians, buildings, etc.

Figure 12:
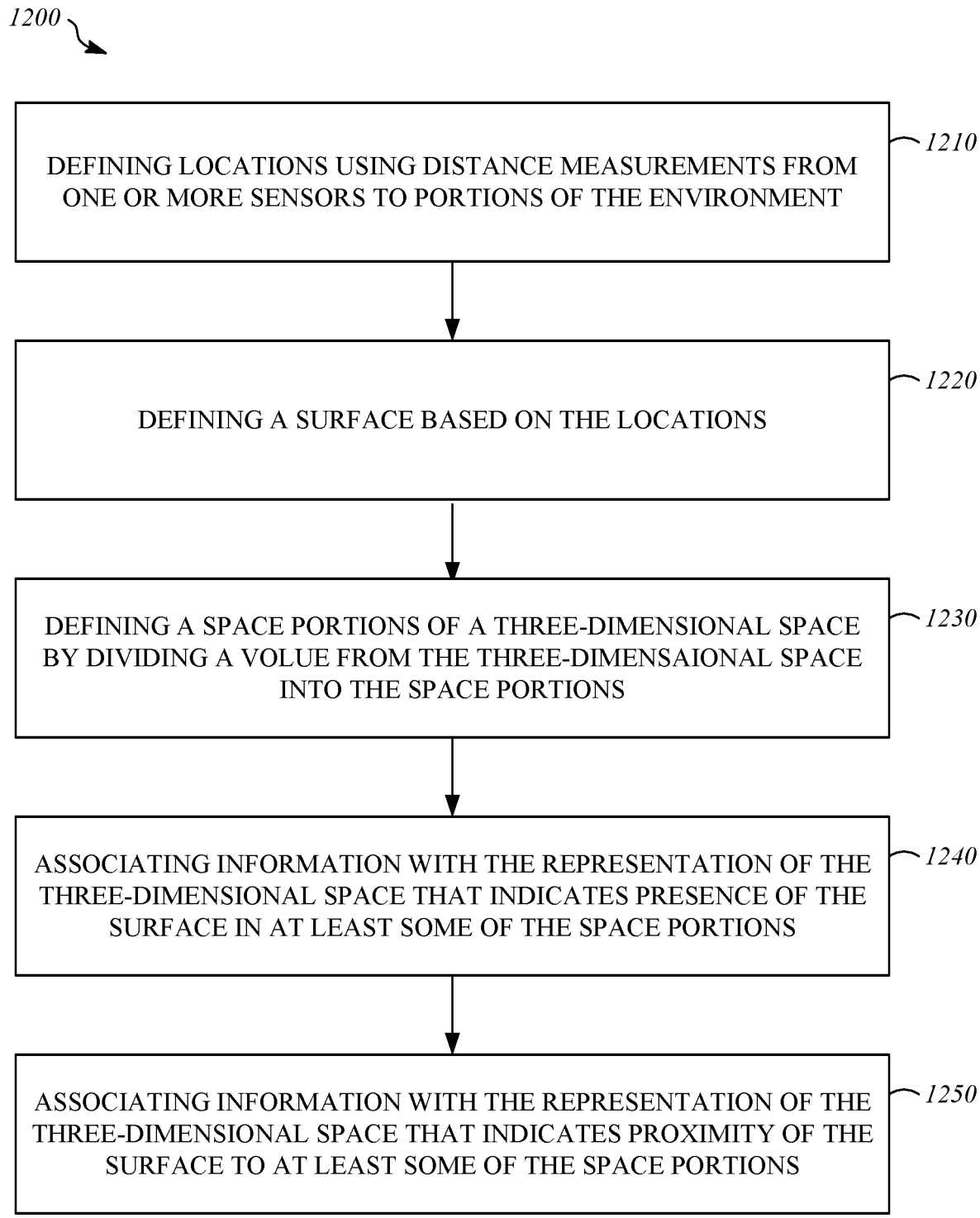
FIG. 12 is an illustration that shows an example of a method for generating a representation of a three-dimensional space.

FIG. 12 is an illustration that shows an example of a method 1200 for generating a representation of a three-dimensional space, and may be utilized to implement operation 1120 of the process 1100. The method 1200 can be executed using a computing device such as one or more processors that execute instruction that are stored in memory. In one implementation, the vehicle 800 is used to implement the method 1200, including use of signals from the range sensor 902 and processing by the automated control system. In other implementations, the method 1200 can be implemented directly in hardware, firmware, or software, circuitry, or a combination thereof.

Operation 1210 includes defining locations using distance measurements from one or more sensors to portions of the environment, as described with respect to the locator. Operation 1220 includes defining a surface based on the locations that were defined in operation 1210, which can be performed in the manner described with respect to the surface generator 110 and the surfaces 112.

Operation 1230 includes defining space portions of the three-dimensional space by dividing a volume from the three-dimensional space into the space portions. For example, the space portions can be as described with respect to the space portions 400.

Operation 1240 includes associating information with the representation of the three-dimensional space that indicates presence of the surface in at least some of the space portions, as described with respect to the filled space portions 404. The information that indicates presence of the surface in at least some of the space portions can be utilized by a machine learning system, such as in the object detector 122, to identify object features.

Operation 1250, which is optional, supplements the data associated with the representation of the three-dimensional space in operation 1240 by indicating proximity to the surface in some of the space portions. Operation 1250 includes associating information with the representation of the three-dimensional space that indicates proximity of the surface to at least some of the space portions, which can be performed as described with respect to the additional data values such as the first group 406 of the space portions 400 and the second group 408 of the space portions 400. This additional information that indicates proximity of the surface to at least some of the space portions is utilized by a machine learning system, such as the object detector 122, to identify the object features.

What is claimed is:

1. A method for detecting an object in an environment, the method comprising:
    obtaining, from one or more sensors, distance measurements from the one or more sensors to the object;
    generating a voxel representation of a three-dimensional space that includes the object;
    associating data values with voxels from the voxel representation of the three-dimensional space using the distance measurements, wherein each of the data values indicates whether presence of the object is detected in a respective one of the voxels, a first group of the data values for a first group of the voxels indicate that each of the first group of the voxels is a filled voxel in which presence of the object is detected, and a second group of the data values for a second group of the voxels in which the presence of the object is not detected indicate a distance to one of the filled voxels;
    identifying object features in the voxel representation of the three-dimensional space based on the data values using a neural network;
    comparing the object features to pre-defined three-dimensional templates to generate scores that represent correspondence of the object features to the pre-defined three-dimensional templates; and
    determining a location and a rotational orientation for a three-dimensional object based on the scores.

2. The method of claim 1, wherein the one or more sensors include LIDAR sensors.

3. The method of claim 1, wherein the voxel representation of the three-dimensional space is a volumetric representation in which the three-dimensional space is divided into the voxels, and the voxels have a predetermined spatial resolution.

4. The method of claim 1, further comprising:
    defining a surface that represents the object based on the distance measurements from the one or more sensors to the object, wherein associating the data values with the voxels from the voxel representation of the three-dimensional space is based on a position of the surface with respect to the voxels.

5. The method of claim 1, wherein:
the pre-defined three-dimensional templates each include rotated bounding boxes that each have a length value, a width value, a height value, and a rotation value, and comparing the object features to the pre-defined three-dimensional templates is performed by a classifier layer using the rotated bounding boxes.

6. The method of claim 1, wherein:
the pre-defined three-dimensional templates each include unrotated bounding boxes and separate rotation values, the unrotated bounding boxes each having a length value, a width value, and a height value, and comparing the object features to the pre-defined three-dimensional templates is performed by a first classifier layer using the unrotated bounding boxes and by a second classifier layer using the separate rotation values.

7. The method of claim 1, wherein the distance to one of the filled voxels is expressed as a number of voxels.

8. A non-transitory computer-readable storage device including program instructions executable by one or more processors that, when executed, cause the one or more processors to perform operations for an object in an environment, the operations comprising:
obtaining, from one or more sensors, distance measurements from the one or more sensors to the object;
generating a voxel representation of a three-dimensional space that includes the object;
associating data values with voxels from the voxel representation of the three-dimensional space using the distance measurements, wherein each of the data values indicates whether presence of the object is detected in a respective one of the voxels, a first group of the data values for a first group of the voxels indicate that each of the first group of the voxels is a filled voxel in which the presence of the object is detected, and a second group of the data values for a second group of the voxels in which the presence of the object is not detected indicate a distance to one of the filled voxels;
identifying object features in the voxel representation of the three-dimensional space based on the data values using a neural network;
comparing the object features to pre-defined three-dimensional templates to generate scores that represent correspondence of the object features to the pre-defined three-dimensional templates; and
determining a location and a rotational orientation for a three-dimensional object based on the scores.

9. The non-transitory computer-readable storage device of claim 8, wherein the one or more sensors include LIDAR sensors.

10. The non-transitory computer-readable storage device of claim 8, wherein the voxel representation of the three-dimensional space is a volumetric representation in which the three-dimensional space is divided into the voxels, and the voxels have a predetermined spatial resolution.

11. The non-transitory computer-readable storage device of claim 8, further comprising:
defining a surface that represents the object based on the distance measurements from the one or more sensors to the object, wherein associating the data values with the voxels from the voxel representation of the three-dimensional space is based on a position of the surface with respect to the voxels.

12. The non-transitory computer-readable storage device of claim 8, wherein:
the pre-defined three-dimensional templates each include rotated bounding boxes that each have a length value, a width value, a height value, and a rotation value, and comparing the object features to the pre-defined three-dimensional templates is performed by a classifier layer using the rotated bounding boxes.

13. The non-transitory computer-readable storage device of claim 8, wherein:
the pre-defined three-dimensional templates each include unrotated bounding boxes and separate rotation values, the unrotated bounding boxes each having a length value, a width value, and a height value, and comparing the object features to the pre-defined three-dimensional templates is performed by a first classifier layer using the unrotated bounding boxes and by a second classifier layer using the separate rotation values.

14. The non-transitory computer-readable storage device of claim 8, wherein the distance to one of the filled voxels is expressed as a number of voxels.

15. A system for detecting an object in an environment, the system comprising:
one or more sensors;
a memory; and
a processor configured to execute instructions stored in the memory, wherein the instructions, when executed, cause the processor to:
obtain, from the one or more sensors, distance measurements from the one or more sensors to the object,
generate a voxel representation of a three-dimensional space that includes the object,
associate data values with voxels from the voxel representation of the three-dimensional space using the distance measurements, wherein each of the data values indicates whether presence of the object is detected in a respective one of the voxels, a first group of the data values for a first group of the voxels indicate that each of the first group of the voxels is a filled voxel in which the presence of the object is detected, and a second group of the data values for a second group of the voxels in which the presence of the object is not detected indicate a distance to one of the filled voxels,
identify object features in the voxel representation of the three-dimensional space based on the data values using a neural network,
compare the object features to pre-defined three-dimensional templates to generate scores that represent correspondence of the object features to the pre-defined three-dimensional templates, and
determine a location and a rotational orientation for a three-dimensional object based on the scores.

16. The system of claim 15, wherein the one or more sensors include LIDAR sensors.

17. The system of claim 15, wherein the voxel representation of the three-dimensional space is a volumetric representation in which the three-dimensional space is divided into the voxels, and the voxels have a predetermined spatial resolution.

18. The system of claim 15, wherein the instructions further cause the processor to:

define a surface that represents the object based on the distance measurements from the one or more sensors to the object, wherein instructions cause the processor to associate the data values with the voxels from the voxel representation of the three-dimensional space based on a position of the surface with respect to the voxels.

19. The system of claim 15, wherein:

the pre-defined three-dimensional templates each include rotated bounding boxes that each have a length value, a width value, a height value, and a rotation value, and the instructions further cause the processor to compare the object features to the pre-defined three-dimensional templates by a classifier layer using the rotated bounding boxes.

20. The system of claim 15, wherein:

the pre-defined three-dimensional templates each include unrotated bounding boxes and separate rotation values, the unrotated bounding boxes each having a length value, a width value, and a height value, and the instructions further cause the processor to compare the object features to the pre-defined three-dimensional templates by a first classifier layer using the unrotated bounding boxes and by a second classifier layer using the separate rotation values.

21. The system of claim 15, wherein the distance to one of the filled voxels is expressed as a number of voxels.

* * * * *